Nov. 15, 1960  G. RUEGENBERG  2,960,145
METHOD OF AND APPARATUS FOR MANUFACTURING LONGITUDINALLY
FOLDED OR LONGITUDINALLY ARCHED, PARTICULARLY
LONGITUDINALLY CORRUGATED WEBS OF
PAPER, CARTON, CARDBOARD, PLASTICS
OR THE LIKE
Filed July 14, 1958
4 Sheets-Sheet 1
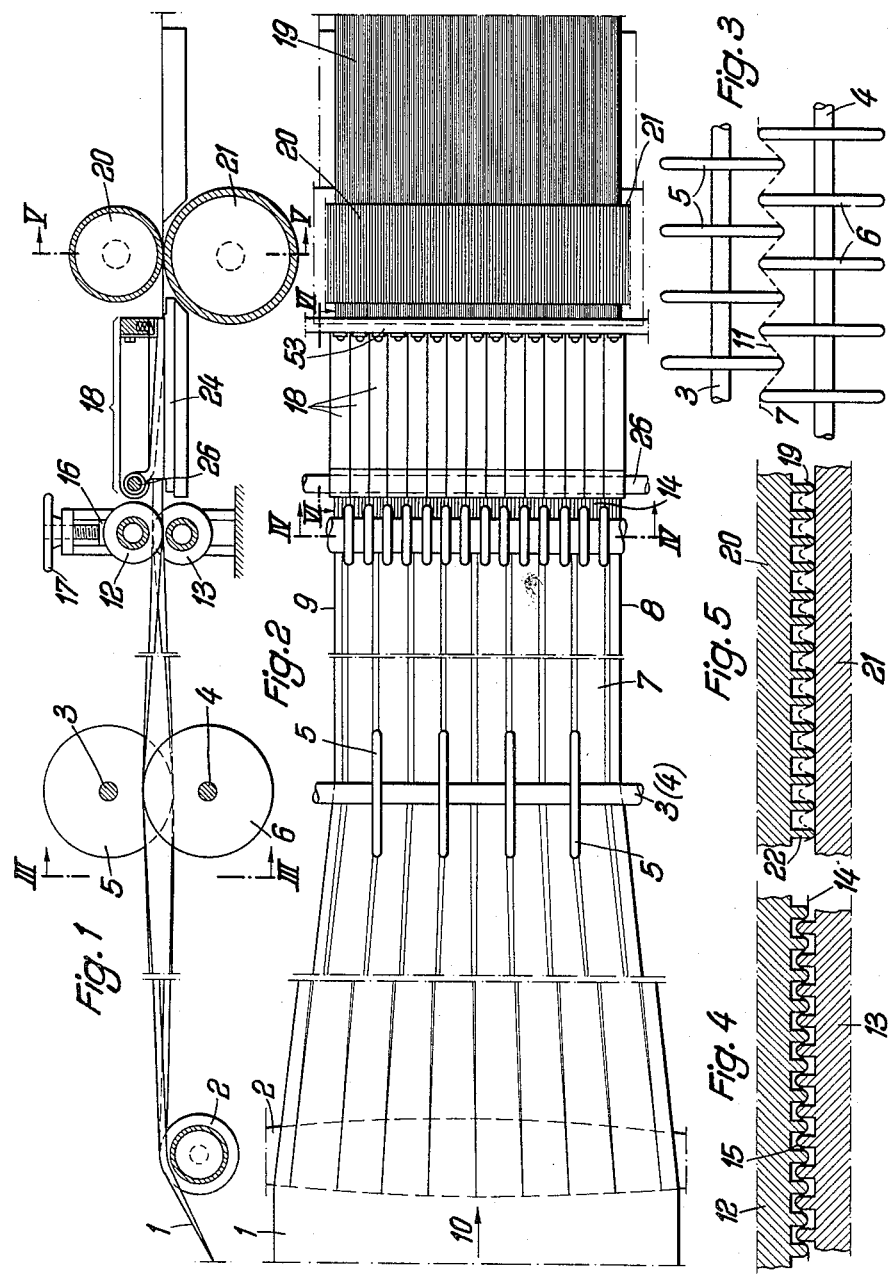
Inventor:
Gottfried
Ruegenberg Nov. 15, 1960 G. RUEGENBERG 2,960,145
METHOD OF AND APPARATUS FOR MANUFACTURING LONGITUDINALLY
FOLDED OR LONGITUDINALLY ARCHED, PARTICULARLY
LONGITUDINALLY CORRUGATED WEBS OF
PAPER, CARTON, CARDBOARD, PLASTICS
OR THE LIKE
Filed July 14, 1958
4 Sheets-Sheet 2
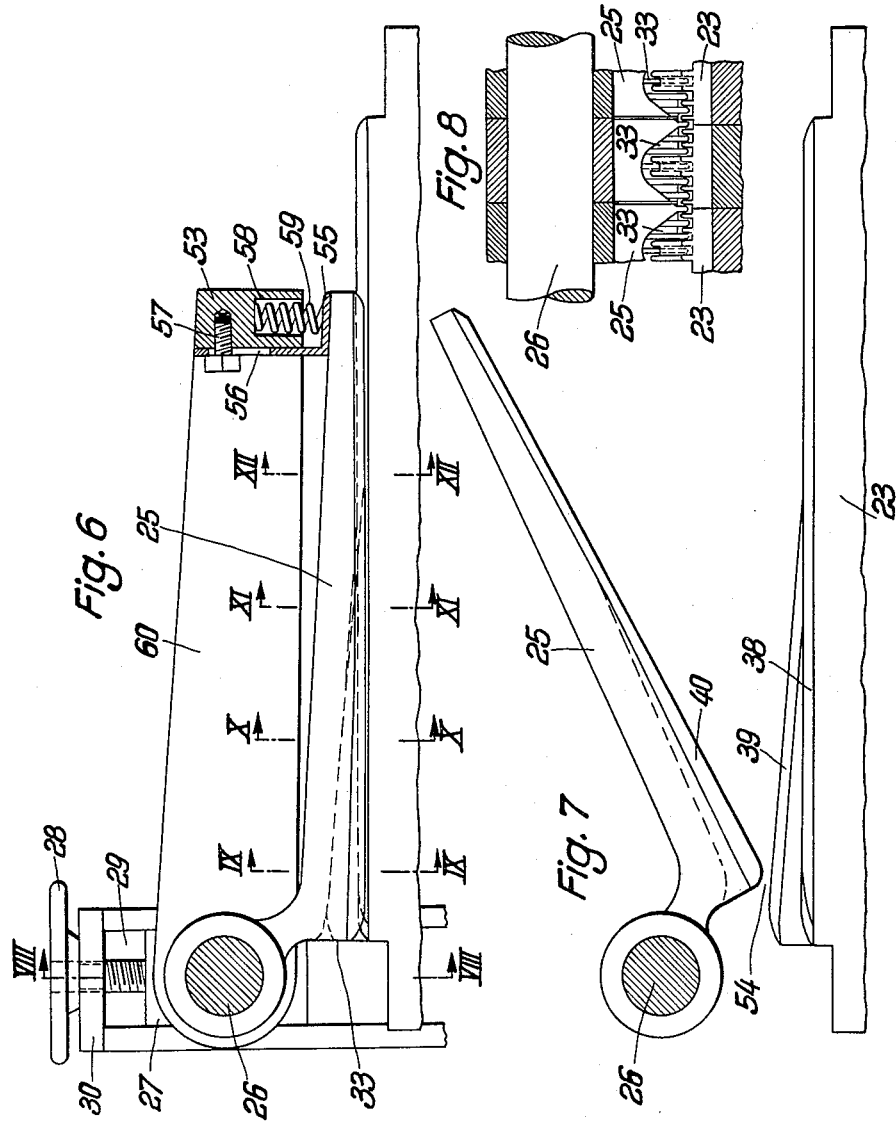
Inventor:

Nov. 15, 1960 G. RUEGENBERG 2,960,145
METHOD OF AND APPARATUS FOR MANUFACTURING LONGITUDINALLY
FOLDED OR LONGITUDINALLY ARCHED, PARTICULARLY
LONGITUDINALLY CORRUGATED WEBS OF
PAPER, CARTON, CARDBOARD, PLASTICS
OR THE LIKE
Filed July 14, 1958 4 Sheets-Sheet 3
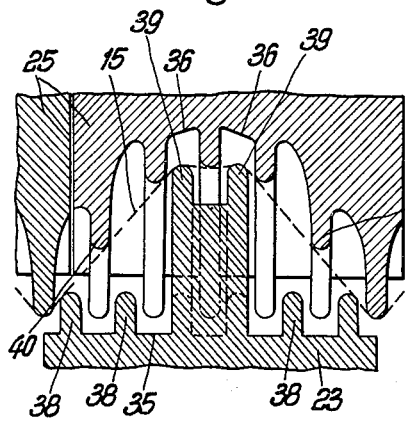
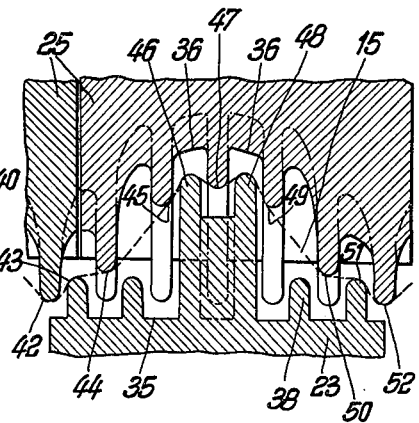
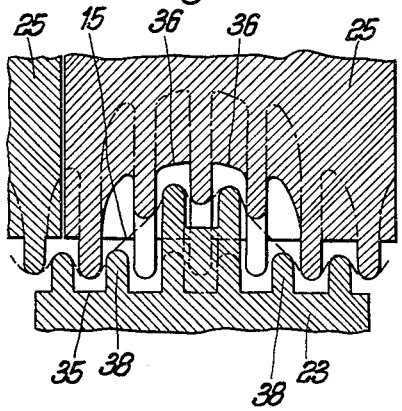
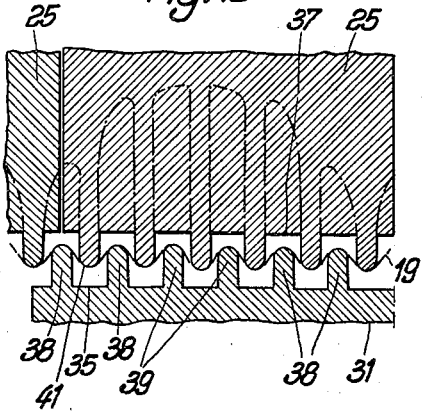
Inventor:

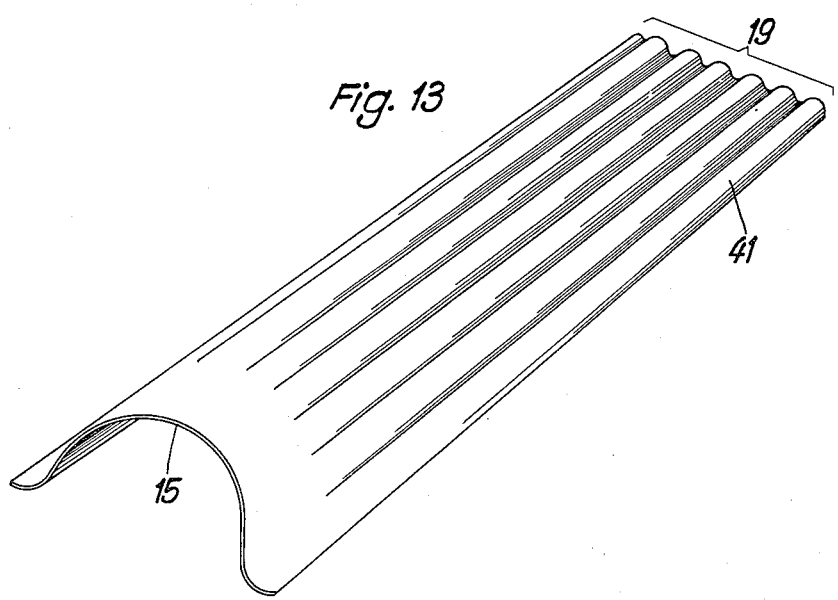

United States Patent Office 2,960,145
Patented Nov. 15, 1960

2,960,145

METHOD OF AND APPARATUS FOR MANUFACTURING LONGITUDINALLY FOLDED OR LONGITUDINALLY ARCHED, PARTICULARLY LONGITUDINALLY CORRUGATED WEBS OF PAPER, CARTON, CARDBOARD, PLASTICS OR THE LIKE

Gottfried Ruegenberg, Hardtweg Olpe, Westphalia, Germany

Filed July 14, 1958, Ser. No. 748,493

21 Claims. (Cl. 154—30)

It is an object of the present invention to provide methods and apparatus for producing longitudinally folded or longitudinally arched, particularly longitudinally corrugated webs of paper, carton, cardboard, plastics or the like.

It is a further object of the invention to avoid the complicated pushing together of the web with suitable devices, beginning at the center of the web; this method was suitably adopted to form on both sides of this center one corrugation after the other until the corrugations extend throughout the width of this web measured at right angles to the direction of movement of this web. It is also intended to avoid the difficulties which are encountered when it is attempted positively to move the web in its entire width, as a whole, between means which enter with converging rib- and groove-shaped profiles into the web to form corrugations in the web in a depth which gradually increases as the pitch of the corrugations is decreased.

It is also desired to eliminate the detrimental effects which result when the web is longitudinally formed with relatively few and for this reason relatively deep or high longitudinal arches or longitudinal corrugations whereas it is attempted in a second operation to refine in stages by appropriately profiled pairs of rolls the arches or corrugations formed by this coarse division across the width of the web. During these attempts the elasticity of the material of the web is not taken into account. Due to this elasticity the arches or corrugations formed tend to spread when the web has emerged from a pair of profiled rolls. Because there will always be a minimum spacing between two pairs of rolls arranged in succession in the longitudinal direction or direction of movement of the web, which spacing will exceed the mean diameter of the rolls, this spreading effect under the influence of elasticity will cause a considerable displacement of the arches or corrugations in the direction at right angles to the direction of movement of the web. As a result, the dividing roll profile draws in too little of the web material at some points and too much at other points. In the former case this material is excessively extended or strained so that tears occur whereas in the second case undesirable folds and wrinkles are formed in the material of the web.

It is finally an object of the invention to provide a method which eliminates all these detrimental effects and in which an overstressing of the material of the web is perfectly avoided so that inadmissible elongation and overtension tending to cause tears will not occur whereas forces which would tend to push the material together and form wrinkles therein are also completely absent. It is intended to subject the material only to bending stresses which it can withstanding owing to its generally fibrous structure. It is desired that the apparatus for carrying out the process should be simple, convenient and reliable in operation and clearly arranged.

Further objects and features of the invention will be apparent from the following definition of the invention.

To avoid the aforesaid difficulties, a method of manufacturing longitudinally folded, particularly longitudinally corrugated webs of paper (carton), cardboard and similar materials such as sheet plastic or metal foil, paper- or cardboard-covered sheet plastic or metal foil, has been developed which is characterized according to the invention in that an aggregation of material obtained by gathering the moving web transversely to its direction of movement is first formed into a number of coarse-pitched arches and that thereafter each of these coarse arches is continuously moved in the direction of movement of the web through a passage of arched cross-section, which is confined by surfaces which are stationary with respect to the movement of the web, the rise of which passage decreases in the direction of movement of the web, said coarse arch being shaped in said passage into a number of finely divided folds, arches or corrugations. Because the inlet cross-section of a part confining this passage can extend closely to the point where the coarsely pitched folds, arches or corrugations are formed, independently of all roll diameters, the natural elasticity of the web material can no longer cause a spreading of the folds, arches or corrugations formed by this coarse dividing of the web. On the contrary, each fold or corrugation is engaged as such, without any possibility of transverse displacement, because it is introduced immediately after its formation through an inlet slot, which conforms to the arched shape of the fold or corrugation, into the passage wherein it is further divided.

It is suitable, of course, to order these operations to the greatest extent possible so that in a development of the invention the folds, arches or corrugations obtained by the coarse division of the web are produced with equally spaced apex lines succeeding in the transverse direction of the web. This enables the parts which confine the stationary passages also to be disposed with a regular spacing one beside the other. It is suitable to produce the folds or arches obtained by the coarse division of the web in the form of corrugations and to each transform of these corrugations into a plurality of more finely pitched arches or corrugations in the tapered passage. In this connection it has proved particularly advantageous to decrease the depth of each of the corrugations which have been produced by the coarse division of the web as it proceeds through the tapered passage in that extent in which the depth of the more finely pitched corrugations is increased. Moreover, each of the corrugations produced by the coarse division of the web will be introduced into a tapered passage through an inlet slot conforming to the cross-section of the corrugation and will be moved out of said passage through an outlet slot which is flattened relative to the arching of the inlet slot. The new process affords the important advance that the width of a web strip moved through the tapered passage, measured as an arch produced by the coarse division of the web and spread into a plane, and as the arches obtained by the finer division and spread into the same plane, is maintained constant during the movement of the web strip through the tapered space. This is of decisive importance because during the entire movement through the tapered passage the web strip material is not subjected to tensile or compressive forces acting at right angles to the direction of movement of the web and imposing an excessively high stress on the material or folding or wrinkling it. When the remarks made hereinbefore with reference to a single arched or corrugated web strip are applied to the entire web, this means that over the cross-section of the arches or corrugations produced by the coarse division of the web the latter is introduced into passages which lie one beside the other and are continuously tapered in the direction of movement and is moved out of said passages through the same number of shallow outlet slots.

The apparatus for carrying out the process is basically characterized by the combination of a device which gathers the web of material transversely to its direction of movement into coarse folds, arches or corrugations, with a stationary shaping device with elements which extend one into the other and between which a plurality of arched slots is defined, through each of which a web strip forming a fold, arch or corrugation is movable and the cross-section of which has the greatest rise at the inlet and gradually decreases in rise in the direction towards the outlet slot. In order to enable the web or an individual strip of the web to be easily inserted into the shaping device at the beginning of the operation the shaping device consists suitably of several parts and at least one parting line extends between the elements extending one into the other. Elements of the shaping device which adjoin an arched slot are preferably formed with ribs and intervening recesses extending in the direction of movement of the web, each rib of one element facing a recess in the other element. The longitudinal ribs are preferably constructed on one side of the web strip to be movable with that part of the shaping device on which they are formed whereas on the other side they are constructed to be stationary with another part of the device. Where a plurality of shaping devices are arranged one beside the other, as is practically essential in order to receive the entire web, the stationary parts form suitably a common baseplate. A cross-beam extends over the top parts of the shaping device, which are preferably rotatable relative to the bottom parts or base plate thereof. This enables the provision of resilient means between the beam and the top parts, which means are preferably adjustable in spring force and force the top parts against a web strip or the web. It has been found that while the web is thus shaped it exerts considerable forces on the movable parts and tends to lift them. Whereas the movable parts could be rigidly backed, this would not enable them to yield sufficiently to the inevitable irregularities of the movement of the web. For this reason it is suitable to use the cross-beam as a common abutment and to produce said spring forces between this abutment and the top parts. It is not essential to use springs because weights, energy storage means and other means of this kind may also be used. The movable parts need not consist of the top parts; they could also be swung down whereas the top parts are combined to form a common platelike support for the whole arrangement. In either case the beam must be removable, particularly by a pivotal movement, so that movable top parts can be swung up to expose the passage through which one web strip is to be moved. In this case the axis about which the parts of the shaping device are relatively movable, e.g. by a rotation or pivotal movement, is disposed near the inlet slot of the device for one web strip. To enable an adaptation to the varying thickness of the material of the web the spacing between the movable and stationary parts of the shaping device, e.g., the height of the axis about which preferably the top parts are movable relative to the bottom parts of the shaping device, is adjustable and can be fixed.

The arrangement and formation of the longitudinal ribs may also be varied to suit the requirements. It is particularly desirable to form the longitudinal ribs on a lower part with which the shaping device confined the passage substantially in a plane and to form the longitudinal ribs on the other side of the web strip on a top part which arcuately confines the cross-section of the passage. In order to conform to this arcuate shape the outer ones of the lower longitudinal ribs are suitably of constant height and the ribs between them preferably decrease in height in the direction from the inlet cross-section to the outlet cross-section. This means that the itnermediate longitudinal ribs have the greatest height in the inlet cross-section for a coarsely arched or corrugated web strip and that this height progressively decreases towards the outlet cross-section. Inversely, the spacing of the surface with which the top part arcuately confines the passage for one web strip from the flat surface with which the lower part confines the passage will continuously decrease in the direction from the inlet cross-section to the outlet cross-section whereas the height of the longitudinal ribs formed on the surface of the top part will be substantially constant in order to provide for the taper of the passage in the direction of movement of the work. If a somewhat greater overall height of the top parts is tolerated, the spacing of the surface with which the top part arcuately confines the cross-section of the passage for one web strip from the flat surface with which the bottom part confines this passage may be substantially constant in the direction from the inlet cross-section to the outlet cross-section; in this case it is necessary continuously to increase in the same direction the height of the ribs formed on the surface of the top part. In either case the selected construction of the shaping device causes a coarsely pitched web arch or corrugation to be divided therein into the desired number of arches or corrugations of lower depth, whereby it is possible to produce a longitudinally corrugated web, in the case of cardboard of so-called longitudinally corrugated cardboard.

The drawing shows an illustrative embodiment relating to the production of longitudinally grooved corrugated cardboard.

Fig. 1 is a side view showing the device which forms coarsely pitched arches or corrugations in the web-shaped work and the stationary shaping devices subsequently arranged in the direction of movement of the web.

Fig. 2 is a top plan view of the entire apparatus of Fig. 1.

Fig. 3 is a cross-sectional view taken on line III—III of Fig. 1, and

Fig. 4 is a vertical cross-sectional view taken on line IV—IV of Fig. 2.

Fig. 5 is a vertical cross-sectional view taken on line V—V of Fig. 1 and is drawn to a greatly enlarged scale compared to Figs. 1 to 4.

Fig. 6 is a longitudinal sectional view taken on line VI—VI of Fig. 2 and shows on a greatly enlarged scale compared to Figs. 1 to 5 one of the stationary shaping devices in closed condition.

Fig. 7 is a sectional view similar to Fig. 6 with the difference that the top part of the stationary shaping device has been swung up from the bottom part to open up a passage.

Fig. 8 is a vertical cross-sectional view taken through the shaping device on line VIII—VIII of Fig. 6.

Fig. 9 is a cross-sectional view taken through the shaping device on line IX—IX of Fig. 6.

Fig. 10 is a cross-sectional view taken on line X—X of Fig. 6.

Fig. 11 is a cross-sectional view taken on line XI—XI of Fig. 6 and

Fig. 12 is a cross-sectional view taken on line XII—XII of Fig. 6.

Fig. 13 illustrates that portion of a web strip which was introduced into the passage of the shaping device shown in Figs. 6 and 7 and shaped there until it emerged from the outlet cross-section. The portions which precede and succeed this web strip in the longitudinal direction of this web strip have been omitted for clearer showing as well as the further web strips which adjoin the web strip considered at right angles to the direction of movement through the passage.

In Figs. 1 and 2, numeral 1 designates the originally flat web of paper material which serves for producing the longitudinally grooved corrugated cardboard. The crowned guide roll 2 is provided for guiding the web. The device for forming coarsely pitched arches or corrugations in the web 1 comprises in the present example two rotary shafts 3 and 4, on which the relatively staggered disc bodies 5, 6 are mounted. In Fig. 3, in which this device is mainly shown, the web is indicated at 7. The disc bodies 5, 6 exert forces onto the web whereby its longitudinal lines are deflected from the direction of movement from the outer edges 8, 9 towards the centre. This deflection is also effective on the web in the direction which is opposite to the direction of movement 10 indicated so that the web is transversely gathered between the guide roll 2 and the disc bodies 5, 6. This gathering has been substantially terminated at the points where the disc bodies 5, 6 engage. As is apparent from Fig. 3 the transverse gathering causes the web 7 to assume a substantially zig-zag configuration in cross-section. Depending on the depth of the interengagement of the disc bodies 5, 6 and on their spacing this configuration may also be arched. One of these arches is indicated at 11.

When the web 7 has thus been shaped as is shown in Fig. 3 it is ordered in the appropriately profiled rolls 12, 13 in order to achieve that, e.g., the apex lines of the curvatures have at right angles to the movement of the web substantially the same wave form, which results from the coarse subdivision of the width of the web. Fig. 4 shows a portion of the rolls 12, 13 at the point of engagement and illustrates their profile. The web has now the cross-sectional shape indicated at 14. The order of magnitude of the wave form must be adapted to practical requirements. In any case it must be so coarse that the surplus area of each width section of the gathered web can slip from one corrugation to the next within the portion of the roll nip receiving it without endangering the web material. To enable a variation of the extent of the interengagement of the disc bodies 5, 6 the shafts 3 and 4 are suitably relatively adjustable. To this end one of the shafts is mounted in vertically adjustable bearing bodies 16 whereas an adjusting means 17 may serve for adjusting and maintaining the desired height.

In order to form finer corrugations in the required manner in each of the corrugations thus obtained by a coarse division of the web—one of these coarse corrugations is indicated at 15 in Fig. 4—the stationary shaping devices, one of which is indicated at 18, are provided, and are arranged one beside the other to receive the entire width of the web, as is shown in Fig. 2. The construction of these stationary shaping devices will be discussed more fully hereinafter. The longitudinally grooved corrugated cardboard produced in this shaping device is indicated at 19 in Fig. 5 and is engaged and drawn in by the rolls 20, 21 which roll one on the other. At the same time at which the completely corrugated web is drawn in, the latter is suitably coated between these rolls 20 and 21 with a flat paper web. Fig. 5 shows the profile of these rolls more clearly. Whereas the surface of the roll 21 is perfectly cylindrical the roll 20 is formed as a grooved roll so that the annular projections 22 of this roll 20 enter into the troughs of the corrugated cardboard 19, which troughs face the projections 22, whereby the lower apices of this corrugated cardboard 19 between the troughs are forced against the roll 21.

Figs. 6 to 12 show the shaping device 18 in detail. It is seen that each of these devices comprises a bottom part 23, which is directly carried by the machine frame 24. A top part 25 is rotatable about a shaft 26. This shaft 26 is continuous because it must extend throughout the width of the web. The ends of the shaft, which are not indicated, are disposed in bearing bodies 27, which are vertically adjustable and can be fixed in position. To this end the hand wheel 28 is provided with the threaded spindle 29 connected thereto. The nut for the threaded spindle is received in the cross-piece 30. This enables a variation of the spacing of all top parts 25 from the bottom parts 23 in dependence on the varying thickness of material of the web 14 to be moved through the devices 18. It is obvious that the bottom parts 23 may be combined to form a common base plate, as is apparent at 31 from Fig. 12. When the device is closed, each top part 25 and an associated bottom part 23 define a passage for one of the corrugations 15 of the web 14. As is apparent upon a comparison between Figs. 9 to 12 this passage 32 has a continuous taper in the direction of movement 10 of the web 14. Because the devices 18 are stationary this passage 32 is confined by surfaces which are stationary relative to the movement of the web. In the direction at right angles to the direction of movement the passage 32 is arched, as is particularly apparent from the top plan view of Fig. 8 taken onto the end faces of the bottom and top parts 23, 25. Thus an arched inlet slot 33 is formed for each corrugation 15. The shaft 26 is disposed near these inlet slots 33. This enables that end of the top part 25 which is opposite to the inlet slot 33 to move freely where it forms the outlet slot 34 (see Fig. 12) for the completely shaped web, which is indicated in this condition at 19, as is required in view of the varying pull-off tensions in the web and possibly also the varying thicknesses of the web, unless this freedom of movement must not be at least partly eliminated by special means, which will be discussed hereinafter. The two opposite surfaces of the bottom and top parts 23, 25 are of different shape. For instance, the surfaces with which the bottom part 23 adjoins the passage 32 may be substantially flat, as is apparent at 35 (see Figs. 9–12), whereas the surfaces 36 with which the top part 25 adjoins the passage 32 follow substantially the arcuate shape of a corrugation 15 obtained by a coarse division of the web (see Fig. 4). Toward the flattened outlet slot 34 the arcuate shape is progressively flattened and is perfectly flat at 37 at the outlet slot 34 itself. Longitudinal ribs are formed, e.g., on the flat surface 35 of each lower part 23 facing the passage 32. As will be apparent upon a comparison of Figs. 9 to 12, the outer longitudinal ribs 38 have substantially the same height. Only the ribs 39 which lie between the outer ribs 38 are higher, being highest adjacent to the inlet cross-section 33. These longitudinal ribs 39 are again flattened as they approach the outlet slot 34 until they have reached the height of the longitudinal ribs 38 in the outlet slot. Inversely, longitudinal ribs 40 are formed on the confining surfaces 36 of arcuate cross-section of each top part 25. Because the spacing between the confining surfaces 36 of arched cross-section and the flat confining surfaces 35 of the bottom part 23 is progressively decreased in the direction from the inlet slot 33 to the outlet slot 34, the ribs 40 may be of constant height as distinguished from the ribs 39. The opposite arrangement is also possible, of course, and is indicated with dash-and-dot lines. According to this second possibility the surfaces 36 follow the dash-and-dot lines of Figs. 9 to 12 so that the spacing between the surface portions 36 and the surface portions 35 is substantially constant. In that case the height of the ribs 40 must increase from the inlet slot 33 towards the outlet slot 34, as is indicated by the dash-and-dot lines.

The action of the stationary shaping device 18 thus constructed on a web strip disposed in the passage 32 is apparent from Fig. 13. As in Fig. 4, 15 is the corrugation obtained by the coarse division of the width of the web into arched or corrugated web strips. As a result of the construction of the shaping device 18 shown in Figs. 9 to 12 the corrugation 15 is subdivided in a continuous fashion until the web strip assumes finally in the outlet slot 34 the shape 19. An individual one of these more finely pitched corrugations is indicated in Figs. 12 and 13 at 41. The formation of these corrugations 41 obtained by the subdivision of the corrugation 15 is distinctly apparent from Figs. 9 to 12. Whereas the corrugation 15 has close to the inlet slot 33 substantially the shape which it had been given by the profile rolls of Fig. 4, Fig. 10 indicates at 42 to 52 the beginning of the formation of the more finely pitched corrugations 41. This formation has become more pronounced in Fig. 11 and the desired final shape has been reached in Fig. 12.

In order to achieve this, however, the top parts 25 must be applied under an appropriate force to the bottom parts 23. This force must be resilient in order to allow for the aforesaid irregularities, variations in the movement, vibration, etc., because the force would otherwise have an undesirable influence on the material of the web. To enable this force to be exerted, a cross-beam 53 is provided above the top parts 25. This cross-beam 53 is shown in operative position in Fig. 6 and can be removed from this position to enable the top parts to be swung up into the position of Fig. 7 so that the web 14 can easily be pulled through the slot 54 thus openend up and can thus be moved into the working position. To this end the cross-beam is secured on both sides of the web 14 to pivoted arms 60, one of which is indicated in Fig. 6. The pivoted arms may be mounted on the same shaft 26 on which the top parts 25 are also pivotally mounted. Instead of these being pivoted on the shaft 26 the arms 60 could be arranged to be lifted and lowered or to be movable in other directions.

Each top part 25 has an angle 55 firmly connected thereto, the longer flange of which extends parallel to the cross-beam 53 and has an elongated hole 56, through which the shank 57 of a screw extends so that the parts 25, 23 have a certain freedom of relative movement within the limits determined by the elongated hole 56. This movability is more or less dampened by the arrangement of springs 59. This means that the top parts 25 can be slightly lifted and lowered in dependence on irregularities caused by the web 14 and its movement whereas they remain always urged against the web 14 by the springs 59.

It is in the nature of the invention that it is not restricted to the embodiment shown in the drawing. For instance, the kind of the material of the web and the form of the finished product 19 may require that the ribs 38, 39, 40 and/or the confining surfaces 35, 36 of the top and bottom parts are entirely different from the illustrative embodiment in design and arrangement.

What is claimed is:

1. The method of producing longitudinally corrugated webs of paper, cardboard or similar materials, consisting of aggregating web material by gathering said web transversely to the direction of movement, forming coarse longitudinal parallel arches in said aggregation of web material, moving each of said coarse longitudinal arches parallel to the other arches, through a passage of arched cross-section, which is confined by surfaces which are stationary relative to the movement of the web, the rise of said passage decreasing in the direction of movement of the web, and transforming in said passage the longitudinal arch of the web moved therethrough into a plurality of finer longitudinal arches.

2. The method of producing longitudinally corrugated webs of paper, cardboard or similar materials, consisting of aggregating web material by gathering said web transversely to the direction of movement, forming coarse longitudinal parallel arches in said aggregation of web material, moving each of said coarse longitudinal arches parallel to the other arches through a passage of arched cross-section, which is confined by surfaces which are stationary relative to the movement of the web, the rise of said passage decreasing in the direction of movement of the web, transforming in said passage the longitudinal arch of the web moved therethrough into a plurality of finer longitudinal arches, and reducing the height of each of the coarsely shaped arches as it is moved through the tapered passage in that extent in which the height of the more finely pitched corrugations is increased.

3. The method of producing longitudinally corrugated webs of paper, cardboard or similar materials, consisting of aggregating web material by gathering said web transversely to the direction of movement, forming coarse longitudinal parallel arches in said aggregation of web material, introducing each of said coarse longtiudinal arches into a passage whose rise decreases in the direction of movement of the web therethrough and is confined by surfaces which are stationary with respect to the movement of the web, which introduction is effected through an inlet slot conforming to the cross-section of the web arch to be introduced, and withdrawing said arch through a flat outlet slot of said passage, transforming in said passage the longitudinal arch of the web moved therethrough into a plurality of finer longitudinal parallel arches.

4. The method of producing longitudinally corrugated webs of paper, cardboard or similar materials, consisting of aggregating web material by gathering said web transversely to the direction of movement, forming coarse longitudinal parallel arches in said aggregation of web material, introducing each of said coarse longitudinal arches into a passage whose rise decreases in the direction of movement of the web therethrough and is confined by surfaces which are stationary with respect to the movement of the web, which introduction is effected through an inlet slot conforming to the cross-section of the web arch to be introduced, and withdrawing said arch through a flat outlet slot of said passage transforming in said passage the longitudinal arch of the web moved therethrough into a plurality of finer longitudinal parallel arches, reducing the height of each of the coarsely shaped arches as it is moved through the tapered passage in that extent in which the height of the more finely pitched corrugations is increased.

5. The method of producing longitudinally corrugated webs of paper, cardboard or similar materials, consisting of aggregating web material by gathering said web transversely to the direction of movement, forming coarse longitudinal parallel arches in said aggregation of web material, moving each of said coarse longitudinal arches through a passage of arched cross-section, which is confined by surfaces which are stationary relative to the movement of the web, the rise of said passage decreasing in the direction of movement of the web, transforming in said passage the longitudinal arch of the web moved therethrough into a plurality of finer longitudinal parallel arches, maintaining substantially constant the width of a web strip changed in cross-sectional shape while being moved through said passage during said movement through said passage, which width is measured for the web strip spread into a plane.

6. The method of producing longitudinally corrugated webs of paper, cardboard or similar materials, consisting of aggregating web material by gathering said web transversely to the direction of movement, forming coarse longitudinal parallel arches in said aggregation of web material, introducing said web through inlet slots conforming to the cross-section of the coarse arches and leading to passages whose rise decreases in the direction in which the web is moved therethrough and are confined by surfaces which are stationary relative to the direction of movement of the web, and withdrawing said web through shallow outlet slots of said passages, transforming in said passages the coarse web arches moving therethrough into a plurality of more finely pitched parallel arches.

7. A machine for producing longitudinally curved webs of paper, cardboard or similar substances in continuous operation, said machine comprising, in combination, means for forming the web of material with parallel arches coarsely distributed across the width of the web, each of said arches extending over a web strip which extends in the longitudinal direction of the web, a stationary shaping device adapted to have said arched web strips moved therethrough, said shaping device comprising a plurality of shaping parts which are arranged one beside the other across the width of the machine and confine parallel arched slot-shaped passages, each of which is adapted to have one longitudinal strip of said web moved therethrough, said confining surfaces being formed with a profile adapted to extend one into the other, the cross-section of the slot-shaped passage at the inlet for the arched web strip being most strongly arched, the cross-section of the slot-shaped passage at the outlet for said web strip being shallow.

8. A machine for producing longitudinally curved webs of paper, cardboard or similar substances in continuous operation, said machine comprising, in combination, means for forming the web of material with parallel arches coarsely distributed across the width of the web, each of said arches extending over a web strip which extends in the longitudinal direction of the web, a stationary shaping device adapted to have said arched web strips moved therethrough, said shaping device comprising a plurality of shaping parts which are arranged one beside the other across the width of the machine and confine parallel arched slot-shaped passages, each of which is adapted to have one longitudinal strip of said web moved therethrough, said confining surfaces being formed with a profile adapted to extend one into the other, the cross-section of the slot-shaped passage at the inlet for the arched web strip being most strongly arched, the cross-section of the slot-shaped passage at the outlet for said web strip being shallow, said profile comprising longitudinal ribs, said longitudinal ribs disposed on both sides of the longitudinal strips of the web being relatively staggered so that one rib on one side of the web strip faces the space between two ribs on the other side of the web strip.

9. A machine according to claim 8, the longitudinal ribs on one side of the web strip being formed on a substantially flat wall which confines said slot-shaped passage.

10. A machine according to claim 8, the longitudinal ribs on one side of the web strip being formed on a substantially flat wall which confines said slot-shaped passage, the longitudinal ribs on the other side of said web strip being formed on a surface of arcuate cross-section of said device, which surface confines said slot-shaped passage, the spacing of said arched wall from the flat wall decreasing from the web strip inlet cross-section to the web strip outlet cross-section of said device.

11. A machine according to claim 8, said shaping device being composite, one parting line lying between the longitudinal ribs disposed on both sides of the web strip, one of the parts being movably arranged with respect to another part.

12. A machine according to claim 8, said shaping device being composite, one parting line lying between the longitudinal ribs disposed on both sides of the web strip, one of the parts being rotatable about an axis relative to another part of said shaping device.

13. A machine according to claim 8, said shaping device being composite, one parting line lying between the longitudinal ribs disposed on both sides of the web strip, one of the parts being rotatable about an axis relative to another part of said shaping device, said axis being arranged closely to the inlet slot of said passage.

14. A machine according to claim 8, said shaping device being composite, one parting line lying between the longitudinal ribs disposed on both sides of the web strip, one of the parts being rotatable about an axis relative to another part of said shaping device, several rotatable parts of the shaping device being identical in construction and a common shaft turnably supporting said rotatable parts.

15. A machine according to claim 8, said shaping device being composite, one parting line lying between the longitudinal ribs disposed on both sides of the web strip, one of the parts being rotatable about an axis relative to another part of said shaping device, several rotatable parts of the shaping device being identical in construction, a common shaft turnably supporting said rotatable parts, a common cross-beam extending over said rotatable parts, connecting means between said cross-beam and movable parts of the shaping device, and moving means for said cross-beam, said cross-beam being adapted jointly to move all movable parts of the device when said cross-beam is moved.

16. A machine according to claim 8, said shaping device being composite, one parting line lying between the longitudinal ribs disposed on both sides of the web strip, one of the parts being rotatable about an axis relative to another part of said shaping device, several rotatable parts of the shaping device being identical in construction and rotatable on a common shaft, a common cross-beam extending over said rotatable parts, connecting means between said cross-beam and movable parts of the shaping device, moving means for said cross-beam, said cross-beam being adapted jointly to move all movable parts of the device when said cross-beam is moved, resilient means between said cross-beam and each of the shaping devices.

17. A machine according to claim 8, said shaping device being composite, one parting line lying between the longitudinal ribs disposed on both sides of the web strip, one of the parts being rotatable about an axis relative to another part of said shaping device, several rotatable parts of the shaping device being identical in construction, a common shaft turnably supporting said rotatable parts, a common cross-beam extending over said rotatable parts, connecting means between said cross-beam and movable parts of the shaping device, moving means for said cross-beam, said cross-beam being adapted jointly to move all movable parts of the device when said cross-beam is moved, resilient means between said cross-beam and each of said rotatable parts of the shaping device, said resilient means consisting of springs, said connecting means between said cross-beam and movable part comprising stops connected to either part and stops on the other part, which embrace the first-mentioned stops with play, said connecting means being adapted to permit of limited changes in the position of the cross-beam and the movable parts of the shaping device relative to each other.

18. A machine according to claim 8, said shaping device being composite, one parting line lying between the longitudinal ribs disposed on both sides of the web strip, one of the parts being movably arranged with respect to another part, the stationary parts of said shaping device being combined in a common base part of said device.

19. A machine according to claim 8, said shaping device being composite, one parting line lying between the longitudinal ribs disposed on both sides of the web strip, one of the parts being movably arranged with respect to another part, means adapted to adjust and fix the spacing of a movable part of the shaping device from a stationary part independently of changes in spacing caused by the movability of the part.

20. A machine according to claim 8, said shaping device being composite, one parting line lying between the longitudinal ribs disposed on both sides of the web strip, one of the parts being movably arranged with respect to another part, one of the parts being rotatable about an axis relative to another part of said shaping device, several rotatable parts of the shaping device being identical in construction, a common shaft turnably supporting said rotatable parts, the stationary parts of said shaping device being combined in a common base part of said device, means adapted to adjust the spacing of said joint shaft from the joint base part of the device.

21. A machine according to claim 8, the longitudinal edges of said ribs being parallel when viewed at right angles to the plane of the web.

References Cited in the file of this patent

UNITED STATES PATENTS

| | | |
|---|---|---|
| 739,276 | Allen | Sept. 22, 1903 |
| 762,033 | Ferres | June 7, 1904 |
| 1,661,393 | Stickney | Mar. 6, 1928 |
| 2,257,429 | Ruegenberg | Sept. 30, 1941 |

FOREIGN PATENTS

| | | |
|---|---|---|
| 541,015 | Great Britain | Nov. 10, 1941 |